(No Model.)

M. A. NYE.
BELT FASTENING.

No. 276,620.  Patented May 1, 1883.

WITNESSES
Wm. A. Lowe
David ...

INVENTOR
Mirtillo A. Nye
by C. Chichester
ATTORNEY

United States Patent Office.

MIRTILLO A. NYE, OF CHARLOTTE, MICHIGAN.

BELT-FASTENING.

SPECIFICATION forming part of Letters Patent No. 276,620, dated May 1, 1883.

Application filed September 14, 1882. (No model.)

*To all whom it may concern:*

Be it known that I, MIRTILLO A. NYE, a citizen of the United States, residing at Charlotte, in the county of Eaton, in the State of Michigan, have invented a new and useful Fastening for Belting, of which the following is a specification.

My invention consists in certain improvements in fastenings for belting, and has for its object the providing of a strong and durable fastening, which can be readily and quickly loosened or detached where it is required to remove the belting, and as readily readjusted or refastened, as hereinafter described and claimed, reference being had to the accompanying drawings, which form part of this specification, in which similar letters of reference indicate corresponding parts in the several figures.

Figure 1:
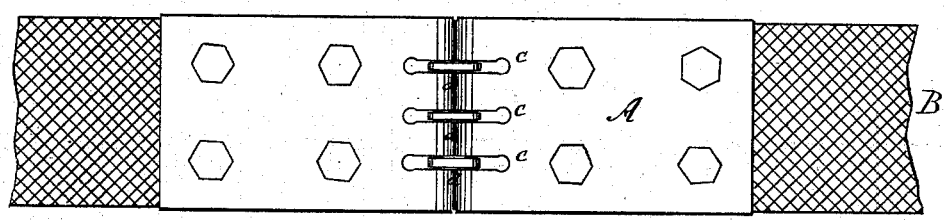
Figure 2:
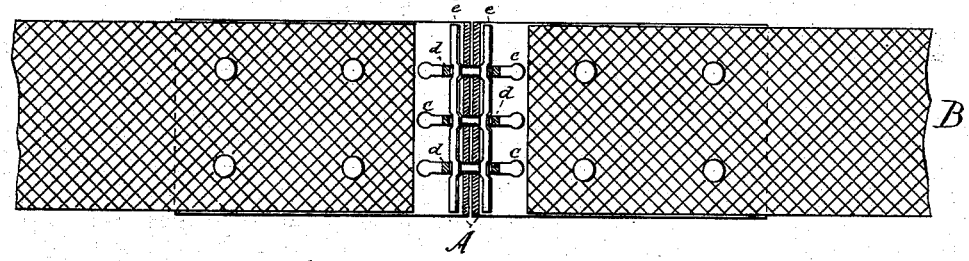
Figure 3:
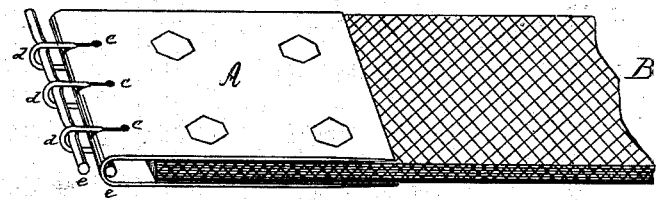
Figure 4:
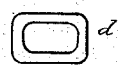
Figure 5:
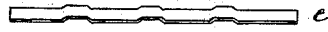

Figure 1 is a plan view of my fastener as it appears when both ends of the belting are joined. Fig. 2 is a sectional plan view of same, showing the means of fastening by links and pins. Fig. 3 is a perspective view of one end of the belting and fastener, showing pin and links when detached from the other end. Figs. 4 and 5 show the detached link and pin, respectively, and indicate the form and construction of the same. These links and pins can be made of either brass, iron, or steel.

A represents a doubled piece of leather or rubber, strongly riveted or otherwise attached to the ends of the belting B, provided with slots $c$ to receive the links $d$, which are secured and held in place by the pins $e$, said pins being irregularly shaped, so as to firmly retain their position without danger of becoming displaced. In order to readily detach or unfasten the belting when held together by this fastener, all that is necessary is to remove one of the pins $e$ and to readjust and refasten the belting. All that is required is to reinsert the pin in the links, as provided for.

I am aware of the existence of a patent on a belt-fastener, (Shigley, No. 214,528, dated April 29, 1879,) in which the two ends of the belting are secured by means of a leather thong or lacing, which is passed through holes in the belting and then laced and secured by tying. My improvement differs materially from this in the particular that in said patent no provision is made for fastening or securing the ends of the belting, except by the use of the leather thong or lacing, as mentioned, whereas in my improvement the fastening and securing the ends of the belting is attained by the use of the metal links and the irregularly-shaped metal pin passed through said links, substantially as shown and described, affording a much stronger and more durable fastening than that of said Shigley. I lay no claim to the method of fastening by the use of the leather thong or lacing; but my invention relates to the method of fastening the ends of belting by the use of the metal links held in place by the irregularly-shaped metal pin, substantially as set forth.

Having thus described my invention, what I claim, and desire to secure by Letters Patent, is—

In a fastener for belting, the combination of the doubled piece of leather or rubber A, attached to the ends of the belting, provided with the slots $c$, with the links $d$, and irregularly-shaped pins $e$, substantially as shown and specified.

MIRTILLO A. NYE.

Witnesses:
 AMOS M. NYE,
 JACOB JACKLE.